Oct. 23, 1945.  H. F. PARKER  2,387,606

JOINER LINK

Filed Nov. 23, 1942

INVENTOR
Humphrey F. Parker
BY
Bean, Brooks, Buckley & Bean
ATTORNEYS

Patented Oct. 23, 1945

2,387,606

UNITED STATES PATENT OFFICE 2,387,606

JOINER LINK

Humphrey F. Parker, Kenmore, N. Y., assignor to Columbus McKinnon Chain Corporation, Tonawanda, N. Y., a corporation of New York Application November 23, 1942, Serial No. 466,538

1 Claim. (Cl. 59—85)

My invention relates in general to chain links and more particularly to links made of separable parts adapted to be fastened together after assembly.

The principal object of my invention has been to provide a link which may be economically manufactured and which will be strong and durable in use.

Another object has been to provide a link made up of separate sections each having substantially duplicate connecting parts which may be easily assembled and disassembled and securely fastened together by suitable screwthreaded means.

Moreover, my link sections are so formed that they may be made largely by means of a drop forging process.

A further object has been to provide a joiner link whose sections are formed with a joint having offset inclined surfaces united at their adjacent ends by an abutment, one surface extending substantially tangentially from the solid end portion of the section and the other surface extending to the tip of each leg portion.

Moreover, the joint in my link is formed with a single engaging abutment, whereby the load taken by the link will not require accurate distribution over a plurality of separated abutting surfaces.

Furthermore, my link sections are provided with reinforcing portions contiguous to the abutments of the joints, such reinforcements being joined to the link portion by means of exterior curved surfaces, thereby permitting the link to pass over objects without catching.

The above objects and advantages have been accomplished by the device shown in the accompanying drawing of which:

Figure 1:
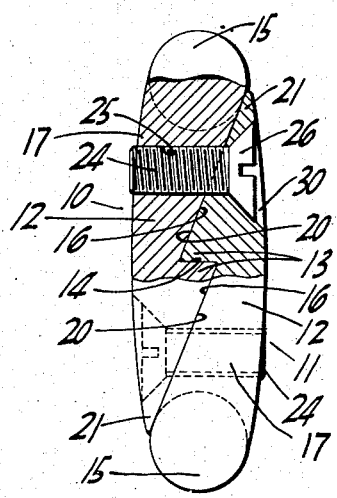
Fig. 1 is a side elevational view of my assembled link with portions thereof in section.
Figure 2:
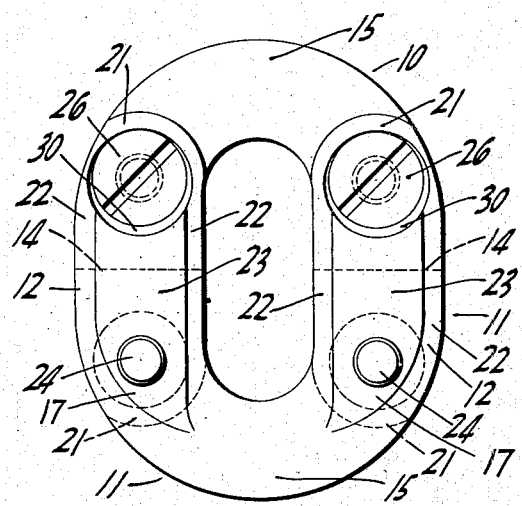
Fig. 2 is a plan view thereof.
Figure 3:
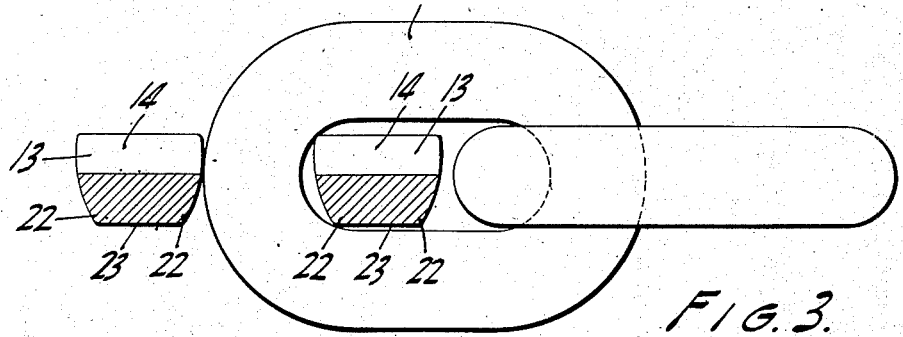
Fig. 3 is an end sectional elevation of one of the link portions of my invention showing it being threaded through a chain link with which the joiner link is to be attached.

Referring particularly to the form of invention shown in Figs. 1 to 3 inclusive, my link comprises two link sections 10 and 11 which are preferably of duplicate formation. As shown in the drawings each of these links is preferably U-shaped each formed with leg portions 12 which are in overlapped relation when the link is assembled. Each leg portion has a relatively thick body part 17 and an attenuated tip 21. Formed on the contiguous face of each of these link portions are two coacting, substantially flat inclined surfaces 16 and 20 which are preferably parallel with one another and in offset relation. An abutment 13 having a shoulder 14 is formed between the adjacent ends of these inclined surfaces. The shoulder is so arranged as to face the body part 17 and the solid end portion 15 of each of the link sections. The surface 16 extends from the bottom of the shoulder 14 to the end portion 15 of each of the sections extending partly over the body part thereof, and the surface 20 extends from the upper edge of the shoulder 14 to the tip 21 of the leg portion.

As shown in Fig. 3, that part of each leg portion 12 which is adjacent the abutment 13 is enlarged so as to reinforce the sections at these points. This reinforcing is brought about by providing longitudinally extending cheeks 22 at each side of the leg portions. So as to secure maximum strength of the reinforcement at these points and still be able to pass the section through a solid link, a flat surface 23 is provided on the exterior surface of the link of each leg portion between the cheeks 22. So as to avoid all protuberances, the surfaces 23 and ridges 22 are convexly curved and streamlined (as shown in Fig. 1), extending toward the end portion 15 and into the body part 17 in tangential manner at one end of each leg portion, and extending to and joining the attenuated tip 21 at the other end thereof.

The link portions are secured together in their assembled positions preferably by means of screws 24, each of which passes through an aperture 25 formed in each of the tips 21, and into the body part 17 of the leg portion 12 of the opposite link section. The screws 24 preferably have countersunk heads 26, and a countersunk aperture 30 is formed for the reception of the head so that it will lie flush with or below the exterior curved surface of the link section.

As shown in Fig. 3 the thickness of the reinforcing surfaces 22 and 23 of each of the leg portions 12 at the abutment is such that each section may be threaded through a solid link 31. Obviously, the solid link will be moved to a position of engagement with the end portion 15 of the link section before the other section of the link is assembled therewith.

As shown in Fig. 1, when my link sections are assembled, the joints between them formed by the coacting surfaces 16 and 20 extend substantially diagonally in longitudinal direction from one end of the completed link to the other and substantially tangentially from the solid end portion 15 at one side of the link to the solid end portion at the opposite side thereof. These coacting surfaces function as guiding surfaces and permit the link sections to be assembled by relative longitudinal movement. Because of the formation and position of these surfaces, the link sections may be easily separated by relative endwise movement tending to move them toward one another; and, should the sections tend to adhere through the presence of rust or the like, the surfaces also function as shearing surfaces whereby the sections may be readily separated by striking them on the ends 15 with a hammer in the direction just above indicated.

Figures 4, 5, 6:
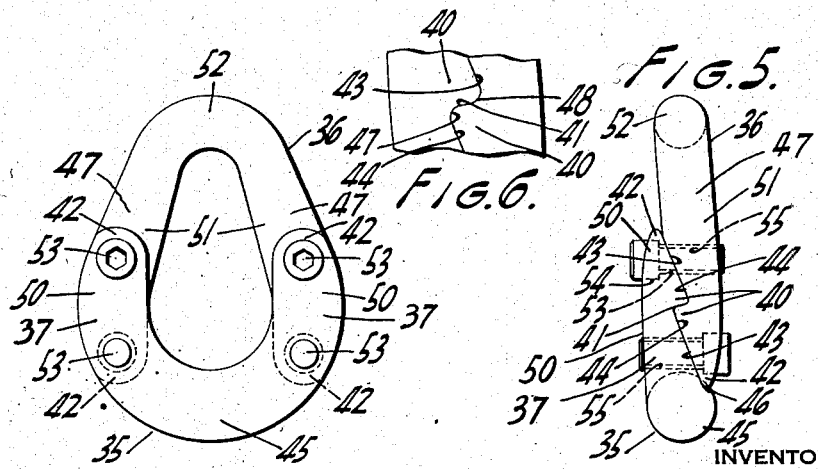
Figs. 4 and 5 show, respectively, an elevational and plan view of a modified form of the invention, showing it applied to a pear-shaped coupling link; and, Fig. 6 is an enlarged fragmentary view of the joint between the link of Figs. 4 and 5.

In Figs. 4 and 5 where I show my invention as applied to a coupling link, the entire link when assembled is preferably of pear-shaped formation, and composed of two sections 35 and 36. In links of this form it is preferable to make the section 35 of stock which is larger in diameter than the stock from which the section 36 is formed.

Each of the sections is formed in its adjacent surface with an abutment 40 forming a shoulder 41. The top of the abutment 40 is joined to the attenuated tip 42 of the section 35 by means of an inclined, substantially flat surface 43. Extending backwardly from the lower portion of the shoulder 41 is a surface 44, which preferably lies in a plane substantially parallel to the surface 43 and extends over the relatively thick body part 37 of the leg portion 50. The surface 44 on link portion 35 lies substantially below the solid end portion 45 thereof and is joined to such surface preferably by the curved surface 46. The abutment 40 of the section 35 is formed in the leg portions 50 of this section.

The section 36 of this form of my link is formed with leg portions 51 each having a relatively thick body part 47 and an attenuated tip 42. Since this section of the link is preferably made from stock of smaller diameter than the section 35, it is necessary that the portion adjacent the joint be reinforced. To this end the leg portions are widened to substantially the full opening of a solid link and are maintained over such widened area at a thickness which will conveniently pass through such solid link. This section of the link is obviously also formed with an abutment 40 and shoulder 41 which face the solid end 52 of the section. Each of the sections 35 and 36 of this form of my invention is formed in the tips with an aperture for the passage of a fastening screw 53, a countersunk aperture 54 being formed in the face of the tip for the reception of at least a portion of the head of the screw. Each of these screws pass into a threaded aperture 55 formed in the body part of each of the sections, whereby the parts may be securely clamped together. While it is preferable to have the coacting faces or shoulders of the abutment substantially perpendicular to the longitudinal axis of the link, as shown in the forms of invention of Figs. 1 to 3, these surfaces may be inclined backwardly a small amount to provide clearance when the sections are made by a drop forging process. Such backward inclination of the shoulders 41 does not affect the strength of the link joint since the screws 53 prevent separation of the sections. It is also preferable in links of large size to join the inclined surfaces 43 and 44 to the shoulders 41 by means of a fillet 47 at the bottom of the abutment and a rounded edge 48 at the upper end thereof for coaction with the fillet 47 of the opposite section.

As shown in Fig. 3, each link section is of necessity first assembled with the solid link or other object to which it is to be attached by having either of its ends passed into and through such link or object, after which the link or object is preferably rotated through substantially 90° until its axis is substantially parallel with the major axis of the joiner link. After the two end links of the chain or other object to be attached have been engaged by each of the sections of the link, the ends of the sections are brought together so as to cause the abutments and adjacent surfaces to engage, after which the sections are securely fastened together by the fastening screws.

Having thus described my invention, what I claim is:

A joiner link, comprising two oppositely arranged, superimposed sections, each section having a one-piece end portion disposed at the longitudinal, closed end of the link and two leg portions extending outwardly therefrom and in the general direction of the longitudinal axis of the link, the leg portions of one section being arranged oppositely to the leg portions of the other section, each leg portion being formed with a relatively thick body part near the end portion and with an attenuated tip, a single abutment located substantially intermediately each tip and adjacent body part, each of said leg portions being formed with only two substantially flat offset surfaces, one of said surfaces joining said tip with said abutment, and the other surface joining the abutment with the body part, each of said abutments forming an angle with the joining flat surfaces, and oppositely arranged fastening means spaced from and at opposite sides of each abutment to secure the sections against lateral separation, each of said fastening means passing through and seating in the attenuated tip of one section and engaged with the body part of the opposite section.

HUMPHREY F. PARKER.